UNITED STATES PATENT OFFICE.

HENRY SPENCER BLACKMORE, OF MOUNT VERNON, NEW YORK.

PROCESS OF MAKING CARBON ACIDS AND KETONES.

No. 817,690.     Specification of Letters Patent.     Patented April 10, 1906.

Application filed July 27, 1900. Serial No. 25,037.

*To all whom it may concern:*

Be it known that I, HENRY SPENCER BLACKMORE, a citizen of the United States, residing at 206 South Ninth avenue, in the city of Mount Vernon, county of Westchester, and State of New York, have invented certain new and useful Improvements in Processes of Making Carbon Acids and Ketones; and I do hereby declare the following to be a full, clear, and exact description of the invention, such as will enable others skilled in the art to which it appertains to make and use the same.

The object of my invention is to produce carbon acids and ketones, such as acetic acid and acetones, synthetically by the union or combination of hydrocarbons with carbonic anhydrid; and it consists in exposing the hydrocarbon to the action of carbon dioxid and heat.

My invention relates particularly to the production of acetic acid and acetone from methane, but is not limited to the production of these compounds as many others may be likewise produced by employing other hydrocarbons, such as the production of benzoic acid and benzophenon from benzin ($C_6H_6$), &c.

In carrying out my invention for the production of acetic acid and acetone from methane I proceed as follows: I take carbon dioxid and pass it through a heated receptacle, such as a series of tubes, whereby it becomes highly heated to a degree approaching its point of dissociation into carbonic oxid and oxygen, at which time it is gradually mixed with methane ($CH_4$ methyl-hydrid) and the product conveyed into a condenser. The highly-heated carbon dioxid coming in contact with the methane causes a dissociation and condensation thereof forming acetic acid and acetone which distils and is condensed. Care must be taken to keep the apparatus at a temperature below the dissociating-point of the products—viz., acetic acid and acetone—otherwise its formation would be precluded and products of their dissociation or decomposition obtained. The reaction which takes place may be illustrated by the following chemical formula or equation:

$$3CH_4 + 2CO_2 + heat = C_2H_4O_2 + C_3H_6O + H_2O$$

or more clearly illustrated by the following steps. Production of acetic acid—

$$CH_4 + CO_2 + heat = C_2H_4O_2$$

or

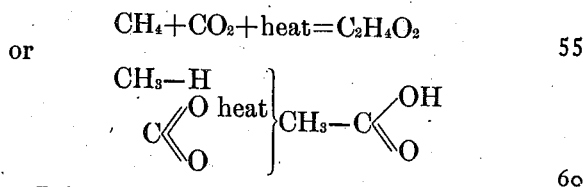

It is obvious that the heating of the carbon dioxid ($CO_2$) only serves to bring it to a point approaching dissociation, so that it readily transforms when brought in contact with reducing agents, such as hydrocarbons, inasmuch as the combination of the elements constitutes a heat-absorbing process and the heat naturally has therefore to be supplied thereto to equalize the deficiency and render combination possible. This heat instead of being introduced directly into the carbon dioxid by heating prior to utilization may be supplied by any convenient means, such as passing a mixture of carbon dioxid and methane through platinum gauze brought to an incandescent heat by the passage of an electric current. When an excess of methane is present and the temperature considerably elevated, a larger portion of acetone and water is produced directly instead of acetic acid, thus—

$$2CH_4 + CO_2 = C_3H_6O + H_2O$$

or

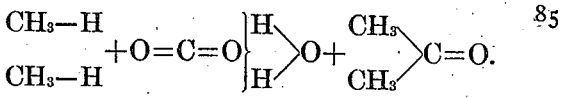

This transformation consists in a further action of the methane on the acetic acid first produced, thus—

$$C_2H_4O_2 + CH_4 = C_3H_6O + H_2O.$$

It is obvious that the production of acetic acid and acetone is more or less simultaneous, and consequently constituting a process, the production of either being governed by heat and the proportion of methane, a lower temperature and limited supply of methane producing a larger product of acetic acid, while a higher temperature and excess of methane favors a larger yield of acetone.

The products should be cooled, condensed, and removed as quickly as possible, conveying the same to a receptacle out of contact with heat in order to affect a larger yield by preventing further transformation.

The apparatus which I prefer to employ in carrying out my invention is illustrated in the accompanying drawings, of which—

Figure 1 is a vertical longitudinal section of my apparatus. Fig. 2 is an enlarged vertical section showing the electric diaphragms and connections in the transforming-chamber, and Fig. 3 a cross-section of one of the rings and electric connection of the transforming-chamber and an electric gauze diaphragm connected therewith.

The letter A designates a transforming-chamber of cylindrical or other form provided at its top with an elbow B and pipe C, the latter connected with a jacketed condenser D in any desired air-tight manner. The lower end of the transforming-chamber A is provided with a detachable head E, having a central stuffing-box or screw-threaded plug F of insulating material connected therewith and in which is fitted a rod or electric connection G, the upper portion of which is formed in sections having screw-threaded connections, as shown at $a$ $a'$ $a''$ in Fig. 2. The transforming-chamber A, like the electric connection G, is partly composed of sections, as shown at $b$ $b'$ $b''$, (see Figs. 1 and 2,) the said sections being joined together by the threaded ends $c$ $c'$ $c''$.

A series of metallic gauze diaphragms $d$ are arranged within the transforming-chamber A, the said diaphragms being securely held in relative positions by the abutting shoulders of the screw-threaded ends of the transforming-chamber rings and of the central connection thereof.

The upper and lower diaphragms $d'$ and $d''$ are arranged in several thickness, forming a heat-absorber and flash-preventer and insulated from the electric connection G, as shown at $e$ $e'$, for the purposes hereinafter fully described.

Peep-holes $f f'$, having mica fronts or covers $h$ $h'$, are located at the opposite sides of the combustion or transforming compartments A' to enable the attendant to view the interior thereof and provide for regulating the apparatus as occasion may require.

The letters $i$ and $i'$ and $i''$ designate electric wires, which are respectively connected with the electric conductor G and the walls of the transforming-chamber A by ordinary means.

The lower part of the transforming-chamber is provided horizontally with a pipe-section H, having a detachable end or head $h''$, within which is tightly fitted a tube $l$, the latter provided with a T-head $l'$ and an inlet-pipe $m$, while within the stem of the T-head and the tube $l$ is arranged a pipe $n$, for the purposes hereinafter fully specified.

In operating my invention for the production of acetic acid and acetone I introduce carbon dioxid into the transforming-chamber A through the inlet-pipe $m$ and methane ($CH_4$) through the pipe $n$ simultaneously, whereupon they become thoroughly mixed by diffusion and pass up through the flashing-diaphragms $d'$ into the combustion or transforming compartment A'. A current of electricity is then turned on through the terminals $i$ $i'$ $i''$, which passing through the gauze diaphragm $d$ $d$ heats the same in proportion to the strength of the current employed.

The temperature of the diaphragm being readily ascertained by looking through the mica-covered peep-holes $f f'$, as the mixture of carbon dioxid and methane comes in contact with the heated diaphragm a condensation or reaction takes place according to the temperature at which the diaphragms are maintained and the proportional mixture of gases, as hereinbefore fully explained.

The temperature of the diaphragms is maintained at a low red heat for the condensation of the gases into acetic acid and at a bright red for producing acetone.

In addition to the absorption of heat and regulation of temperature by the heat-absorbing diaphragms it should be noted that a large amount of the heat which would become evolved by the direct oxidation of the hydrocarbon is taken up in the condensation or formation of the products—in other words, the condensation or transformation constitutes an endothermic process.

The current of gases passing through immediately removes the product and prevents the temperature from rising above the dissociating-point of the product desired, which is controlled by the flow of gases introduced and the temperature of the electrical gauze diaphragm $d$ $d$, which is regulated by the amount of electricity caused to flow therethrough in a given time.

The products conveyed from the transforming or combustion apartment A' pass through the outer heat-absorbing or flash-preventing gauze diaphragms $d''$, which absorb the excess of heat, conducting it therefrom, and thus prevent the decomposition of the product at high temperature which might otherwise accumulate and enabling the operation to be practically and fully controlled. The product after cooling by passing through the gauze heat-strainers or outer flash-gauze diaphragms, passes into the water-jacketed condenser D through the pipe C, where it is condensed and withdrawn from time to time, as desired. It can be thus readily seen, however, that after starting or commencing the reaction by properly regulating the apparatus, supply of gases, &c., the process can be carried on continuously without interruption.

The term "carbon acid" as employed herein has reference to compounds containing carbon, hydrogen, and oxygen, or such as were formerly known as "organic" acids before the development of the chemistry of carbon compounds and synthetic chemistry.

Having now described my invention, what I claim as new, and desire to secure by Letters Patent, is—

1. The process of producing carbon acids and ketones, which consists in exposing hydrocarbon to the action of carbon dioxid at a temperature at which oxygen thereof has a selective affinity for the hydrogen content of the hydrocarbon.

2. The process of producing compounds containing carbon, hydrogen, and oxygen, which consists in exposing hydrocarbon to the action of carbon dioxid at a temperature at which carbon dioxide yields oxygen to the hydrogen of the hydrocarbon while maintaining the temperature below the dissociating-point of the product desired.

3. The process of producing carbon acid and ketone which consists in gradually supplying heat to carbon dioxid and hydrocarbon while in contact after having established a combining or reacting sphere of temperature and collecting and condensing the product thereof.

4. The process of producing carbon acids and ketones, which consists in inducing a union or reaction between carbon dioxid and hydrocarbon by supplying heat thereto and maintaining the temperature within the combining or reacting sphere below the dissociating-point of the product desired.

5. The process of producing acids and ketones, which consists in heating carbon dioxid to a point at which oxygen thereof has a selective affinity for hydrogen of the hydrocarbon, mixing the same with hydrocarbon and collecting and condensing the product produced thereby.

6. The process of producing acetic acid and acetone which consists in exposing methane to the action of carbon dioxid and heat.

7. The process of producing acids and ketones, which consists in exposing hydrocarbon to the action of a carbon oxid at a temperature at which a union or reaction is induced and continuing the process by supplying heat and ingredients thereto while maintaining the temperature below the dissociating-point of the product desired.

8. The process of producing acids and ketones, which consists in establishing a sphere of reaction or combination within a fluid body containing hydrocarbon and carbon oxid and maintaining the reaction or combination by supplying heat thereto.

9. The process of making carbon acids and ketones, which consists in subjecting hydrocarbon to the action of an oxygen-yielding carbon compound at a reacting temperature maintained below the dissociating-point of the product desired.

10. The process of making carbon acids and keytones, which consists in subjecting hydrocarbon to the action of a carbon oxyacid anhydrid at a reacting temperature maintained below the dissociating-point of the product desired.

In testimony whereof I affix my signature in presence of two witnesses.

HENRY SPENCER BLACKMORE.

Witnesses:
WARREN C. STONE,
H. N. JENKINS.